UNITED STATES PATENT OFFICE.

MAXIMILLIAN TREMBOUR, OF BIRMINGHAM, ALABAMA, ASSIGNOR TO PUTNAM DEVELOPMENT COMPANY, A CORPORATION OF NEW YORK.

PROCESS FOR MANUFACTURING CEMENT.

932,917. Specification of Letters Patent. Patented Aug. 31, 1909.

No Drawing. Application filed September 26, 1908. Serial No. 454,916.

*To all whom it may concern:*

Be it known that I, MAXIMILLIAN TREMBOUR, a subject of the German Emperor, and a resident of the city of Birmingham, in the county of Jefferson and State of Alabama, have invented a certain new and useful Process for Manufacturing Cement, of which the following is a specification.

This invention relates to the process of manufacturing cement from furnace slag.

It is well known that slag is composed of different silicates, certain of which under proper conditions, and when ground to a fine powder, possess hydraulic properties. Under other conditions the hydraulic properties of these silicates are either lost or greatly lessened. To produce the conditions under which the silicates possessing hydraulic properties are present in the largest percentage and are most active, various means have been adopted, such as cooling the molten slag slowly or quickly, or by cooling the slag with air, water, salt solutions and various other means.

The object of my invention is to produce such chemical and physical changes in the slag that when it is cooled and powdered it will possess the proper percentage of hydraulic silicates under conditions which will cause the cement to set with sufficient rapidity and strength to render it valuable for commercial purposes.

Further objects of my invention are to drive off a portion of the sulfur which is present in the slag and to substitute in place thereof sulfuric acid which by combination with lime present in the slag, forms gypsum, which when present in slag cement accelerates the setting thereof.

Other objects of my invention are pointed out in the following specification and in the appended claims.

My invention consists in introducing into the liquid blast furnace slag any acid solution in sufficient quantities to produce the desired results above mentioned. Also in introducing into the liquid slag a solution containing sulfuric acid, where it is desired to accelerate the setting qualities of the cement by causing gypsum to be formed therein. Also in introducing into and intimately mingling gypsum with the molten slag. Also in introducing into and intimately mingling with the liquid slag, oxid or hydrate of lime where the slag is deficient in lime and contains an excess of silica. Also in the particular features set forth in the appended claims.

In practice I have obtained excellent results as follows: I separate the liquid slag as it flows from the furnace into small molten globules, by any well known means, as for instance, by discharging the liquid slag upon a rapidly rotating drum, a plate or other surface being so disposed with reference to the drum that the globules of molten slag will be thrown against the face thereof and be collected thereon in grape-like masses, and spray my acid solution upon the particles as they fly from the drum and while they are clinging to said surface.

When, for any reason, I do not find it desirable to use sufficient acid solution to produce the desired quantity of gypsum, or when I use any other acid than sulfuric acid, which is the only acid which will cause gypsum to be formed in the molten slag, I add gypsum in solution or suspension, in my acid solution, or, I blow finely powdered gypsum upon the globules as they pass from the drum to the said surface, and while they are clinging thereto.

When I find a slag to be deficient in lime and high in silica, I also supply lime thereto by spraying water containing the desired amount of lime, in solution and suspension, or I blow finely powdered oxid or hydrate of lime in the desired quantity, upon the molten globules, as above described. This finely powdered gypsum or lime, or both, do not however form an entire chemical combination with the molten slag, but for the most part lie in the form of minute solid particles on the outer surface of the molten globules and prevent the globules from re-uniting into a compact mass when they are again brought into contact with each other, and thus produce changes in the physical structure of the slag when cooled, which cause it to solidify into a cinder like product which is easily broken up and pulverized and produces a more uniform and better quality or grade of cement.

In practice I have obtained the best results by using a solution of one half of one per cent. to two per cent. of sulfuric acid, having two per cent. to four per cent. of gypsum dissolved and in suspension therein. I vary the amount of solution used from twenty-five per cent. to fifty per cent. of the weight of slag treated, the amount of solution used and its concentration depending upon the temperature and chemical composition of the slag treated. The exact concentration and the amount of acid solution best adapted for the treatment of any given slag can only be determined however, by experiment, and the same is true in regard to the amount of gypsum or lime, or both, which should be supplied. These facts are, however, readily ascertainable by experiment.

By my process I have been able to make a satisfactory cement, even from slag containing a very high percentage of silica and a comparatively small percentage of lime, for example: A cement made by my process from slag containing thirty-seven to forty per cent. of silica, and from forty-four to forty-seven per cent. of oxid of lime, produced results which met the standard tensile strength requirements of Portland cement. By using the limited amount of solution above mentioned, the resulting clinker-like product is anhydrous and does not require artificial drying.

By the means which I have described the foreign matter supplied to the slag is intimately mingled therewith while the slag is in a molten condition, and the physical structure of the slag when cooled is modified or changed, with the result that the solidified slag is more easily crushed and pulverized and that a better and more uniform cement is produced, which will meet the standard tensile strength requirements for Portland cement.

I am aware that acids have been added to slag after the slag had cooled and solidified, but the results obtained by this method are not the same as those obtained by the method described.

Having described my invention, what I claim as new and desire to secure by Letters Patent, is:—

1. The process of manufacturing cement from furnace slag which consists in adding to and intimately mingling with the molten slag, a solution of sulfuric acid.

2. The process of manufacturing cement from blast furnace slag which consists in first adding to the slag in a molten state, oxid or hydrate of lime, and then adding a solution of sulfuric acid.

Signed at the city of Birmingham in the county of Jefferson and State of Alabama, this 17th day of September, A. D. 1908.

MAXIMILLIAN TREMBOUR.

Witnesses:
C. F. HORST, Jr.,
W. H. BERESFORD.